(12) United States Patent
Schrauwen et al.

(10) Patent No.: US 8,731,349 B2
(45) Date of Patent: May 20, 2014

(54) INTEGRATED PHOTONICS DEVICE (75) Inventors: Jonathan Schrauwen, Gentbrugge (BE); Stijn Scheerlinck, Ledeberg (BE); Günther Roelkens, Melle (BE); Dries Van Thourhout, Ghent (BE)

(73) Assignees: IMEC, Leuven (BE); Universiteit Gent, Ghent (BE)

( * ) Notice: Subject to any disclaimer, the term of this patent is extended or adjusted under 35 U.S.C. 154(b) by 398 days.

(21) Appl. No.: 12/993,407

(22) PCT Filed: May 19, 2009

(86) PCT No.: PCT/EP2009/056049
§ 371 (c)(1),
(2), (4) Date: Nov. 18, 2010

(87) PCT Pub. No.: WO2009/141332
PCT Pub. Date: Nov. 26, 2009

(65) Prior Publication Data
US 2011/0075970 A1    Mar. 31, 2011

Related U.S. Application Data (60) Provisional application No. 61/143,775, filed on Jan. 10, 2009, provisional application No. 61/054,401, filed on May 19, 2008.

(51) Int. Cl.
*G02B 6/34*    (2006.01)

(52) U.S. Cl.
USPC .................. 385/37; 385/14; 385/15; 385/27; 385/31

(58) Field of Classification Search
USPC .............. 385/14–15, 27, 31, 36–37, 129–130
See application file for complete search history.

(56) References Cited

U.S. PATENT DOCUMENTS

| | | | | | |
|---|---|---|---|---|---|
| 3,883,221 | A | * | 5/1975 | Rigrod | 385/36 |
| 5,208,882 | A | * | 5/1993 | Strasser et al. | 385/37 |
| 7,155,085 | B2 | * | 12/2006 | Laudo | 385/24 |
| 7,181,103 | B1 | * | 2/2007 | Greiner et al. | 385/24 |
| 7,190,859 | B2 | * | 3/2007 | Greiner et al. | 385/37 |
| 7,221,825 | B2 | * | 5/2007 | Reed et al. | 385/37 |
| 7,286,732 | B2 | * | 10/2007 | Greiner et al. | 385/37 |

(Continued)

OTHER PUBLICATIONS

PCT International Search Report and Written Opinion, PCT International Application No. PCT/EP2009/056049 dated Sep. 2, 2009.

(Continued)

*Primary Examiner* — Ryan Lepisto
*Assistant Examiner* — Guy Anderson
(74) *Attorney, Agent, or Firm* — McDonnell Boehnen Hulbert & Berghoff LLP (57) ABSTRACT

The present invention relates to an integrated photonic device (100) operatively coupleable with an optical element (300) in a first coupling direction. The integrated photonic device (100) comprises an integrated photonic waveguide (120) and a grating coupler (130) that is adapted for diffracting light from the waveguide (120) into a second coupling direction different from the first coupling direction. The integrated photonics device also comprises a refractive element (110) disposed adjacent the grating coupler (130) and adapted to refract the light emerging from the grating coupler (130) in the second coupling direction into the first coupling direction.

26 Claims, 7 Drawing Sheets

(56) References Cited

U.S. PATENT DOCUMENTS

| | | | |
|---|---|---|---|
| 7,355,162 B2* | 4/2008 | Sidorin | 250/227.11 |
| 7,729,579 B1* | 6/2010 | Greiner et al. | 385/37 |
| 2002/0172464 A1* | 11/2002 | Deliwala | 385/40 |
| 2003/0039430 A1* | 2/2003 | Deliwala | 385/14 |
| 2003/0039439 A1* | 2/2003 | Deliwala | 385/30 |
| 2003/0059152 A1* | 3/2003 | Deliwala | 385/14 |
| 2003/0118306 A1* | 6/2003 | Deliwala | 385/125 |
| 2003/0174946 A1* | 9/2003 | Viens | 385/37 |
| 2003/0185514 A1* | 10/2003 | Bendett et al. | 385/48 |
| 2003/0235370 A1* | 12/2003 | Taillaert et al. | 385/50 |
| 2004/0007662 A1* | 1/2004 | Sidorin | 250/227.11 |
| 2004/0042377 A1* | 3/2004 | Nikolai et al. | 369/112.09 |
| 2004/0184734 A1* | 9/2004 | Mihailov et al. | 385/37 |
| 2004/0208579 A1* | 10/2004 | Bendett et al. | 398/84 |
| 2005/0286832 A1* | 12/2005 | Witzens et al. | 385/37 |
| 2006/0120667 A1* | 6/2006 | Reed et al. | 385/37 |
| 2007/0019910 A1* | 1/2007 | Greiner et al. | 385/37 |
| 2007/0154144 A1* | 7/2007 | Greiner et al. | 385/37 |
| 2007/0297718 A1* | 12/2007 | Oikawa | 385/27 |

OTHER PUBLICATIONS

Roelkens, Gunther et al., "High Efficiency Grating Coupler Between Silicon-on-Insulator Waveguides and Perfectly Vertical Optical Fibers", Optics Letters, vol. 32, No. 11, Jun. 1, 2007, pp. 1495-1497.

* cited by examiner

INTEGRATED PHOTONICS DEVICE

CROSS-REFERENCE TO RELATED APPLICATIONS

The present application is a national stage application of International Patent Application no. PCT/EP2009/056049, which claims priority to U.S. Provisional Patent Applications Nos. 61/054,401 and 61/143,775.

FIELD OF THE INVENTION

The present invention relates to integrated photonics. More in particular, it relates to coupling of light between an optical element and a waveguide on a photonic integrated circuit.

BACKGROUND OF THE INVENTION

The silicon-on-insulator (SOI) platform is a promising candidate for future ultra-compact photonic integrated circuits because of its compatibility with complementary metal-oxide semiconductor (CMOS) technology. The high index contrast between the silicon core and the oxide cladding allows for the fabrication of short waveguide bends and therefore circuits with a high degree of integration. Efficient coupling between a high index contrast waveguide and an optical fiber is an important issue, but can be difficult due to the large mismatch in mode size and mode shape between the fundamental mode of the waveguide and the mode of the optical fiber.

Out-of-plane grating couplers may be used as a solution to this problem. Due to the large index contrast such gratings can be very compact and broadband. Furthermore, the out-of-plane approach can make polished facets unnecessary and can enable wafer scale testing of integrated optical circuits. However, this approach has several inconveniences. A first inconvenience is the limited efficiency of coupling between optical fiber and silicon waveguide modes. This can be addressed by incorporating a bottom mirror to redirect the downward refracted light, by applying a poly silicon overlay or by forming slanted slits. A second inconvenience is the need for an adiabatic taper, which typically can be on the order of 500 μm long.

One major inconvenience in the use of out-of-plane coupling is that substantially vertical coupling (i.e. coupling in a direction that is substantially perpendicular to the average plane of the integrated optical circuit) tends to suffer from large second-order Bragg reflection back into the waveguide (e.g., when coupling light between a waveguide and a fiber). Accordingly, off-normal (or off-vertical) coupling is typically used. Off-normal coupling is typically done at about 10° with respect to the normal to the average plane of the integrated photonic circuit. When typical gratings are designed for perfectly vertical or substantially vertical coupling, the second Bragg diffraction order can cause large reflections, resulting in a low coupling efficiency. It has been proposed to use a thin slit adjacent to the grating, with the purpose of achieving destructive interference for the second order Bragg reflection. However, this approach would not be completely satisfactory because reflections are only canceled in a narrow wavelength range.

Light generation in silicon is difficult and therefore there is a need for integrating optical components based on other materials, such as for example optical components comprising III-V semiconductors, on silicon integrated photonic circuits. Examples of such optical components are light sources, such as e.g. Vertical Cavity Surface Emitting Lasers or VCSELs.

A first method for the integration of III-V semiconductor based light sources on silicon integrated circuits is bonding of a III-V semiconductor wafer or parts of such a wafer onto a processed silicon wafer, either by direct bonding or by bonding with an intermediate polymer layer. However, the yield and reliability of these techniques are currently too low for commercial application. A second method is the integration of finished III-V semiconductor devices, such as for example horizontal cavity lasers (e.g. distributed feedback (DFB) lasers or Fabry-Perrot lasers) or vertical cavity lasers (VCSELs) by flip-chip soldering or metal bonding. In this case the coupling of the optical mode from the light source to the underlying device is crucial. In case of horizontal cavity lasers, this coupling can be obtained by etching angled facets on the horizontal cavity lasers and providing the underlying circuit with vertical grating couplers. Horizontal cavity lasers are intrinsically bigger than vertical cavity lasers. As they require more space on the circuit, they are less interesting for high-level miniaturization. Moreover, the etching of angled facets on horizontal cavity lasers is a complicated, expensive and time-consuming process. Vertical cavity lasers do not require angled facets for light coupling to integrated circuits but direct vertical coupling to a waveguide can require a special grating coupler that allows substantially vertical coupling, as for example described by G. Roelkens et al. in "High efficiency grating coupler between silicon-on-insulator waveguides and perfectly vertical optical fibers" in Optics Letters, Vol. 32, No. 11, 2007. However, this type of grating coupler has not yet been experimentally demonstrated and it does not function in a broad wavelength range.

There remains a need for substantially vertical coupling between optical elements and waveguides on photonic integrated circuits over a broad wavelength range. Substantially vertical coupling can facilitate fiber mounting and thus lead to lower packaging costs, especially in case of one- or two-dimensional fiber arrays. Vertical fibers can also be more advantageous for wafer scale testing schemes with multiple fibers. Substantially vertical coupling can further open opportunities for bonding of optical components such as for example III-V light sources on silicon photonic integrated circuits.

SUMMARY OF THE INVENTION

It is an object of the present invention to provide good methods and systems for optically coupling between an optical element and an integrated photonic device, as well as methods for making such systems.

It is an advantage of embodiments according to the present invention that systems and methods are provided whereby good optical coupling can be obtained using integrated components, thus avoiding complex or fault-sensitive positioning or mounting.

It is an advantage of embodiments of the present invention that user-friendly systems and methods are obtained.

It is an advantage of embodiments of the present invention that methods and systems are provided allowing efficient optical coupling between an integrated photonic device and an optical element guiding light in a perpendicular direction to the integrated photonic device, such as for example a vertical cavity surface emitting laser. It is an advantage of such embodiments that coupling can be performed with a low degree of reflection.

It is an advantage of embodiments according to the present invention that systems are provided that can easily be fabricated using wafer scale fabrication techniques.

It is an advantage of embodiments according to the present invention that systems and methods are provided wherein efficient optical coupling can be reached in a substantially large wavelength range, e.g. compared to the theoretical coupling obtained using a vertical grating coupler.

One aspect of the invention is an integrated photonic device operatively coupleable with an optical element in a first coupling direction, the integrated photonic device comprising an integrated photonic waveguide; a grating coupler that is adapted for diffracting light from the waveguide into a second coupling direction different from the first coupling direction; and a refractive element disposed adjacent the grating coupler and adapted to refract the light emerging from the grating coupler in the second coupling direction into the first coupling direction. The first coupling direction can be, for example, perpendicular to the average plane of the waveguide. The refractive element can be, for example, a wedge-shaped element integrated with the grating coupler. Based on the functionality of the optical components and the reversibility of the light path, the refractive element thus also may be adapted for refracting light from the optical element in a first coupling direction into a second coupling direction, different from the first coupling direction, and the grating coupler may thus be adapted for diffracting light emerging from the second coupling direction into the integrated photonic waveguide. The refractive element may be integrally formed in the integrated photonic device, i.e. it may be directly formed in the integrated photonic device rather than making or forming it separately and then merging both the refractive element and the remainder components of the integrated photonic device. It is an advantage of embodiments according to the present invention that fabrication in this way can be made more easily compared to solutions where a merge of components is performed afterwards. It is an advantage of embodiments according to the present invention that the refractive element is formed on, i.e. integrated with, the grating coupler, allowing integration using reliable and cost efficient integration techniques. The refractive element may be in direct contact with the grating coupler. The refractive element advantageously may be directly formed on the grating coupler or may be formed on the grating coupler such that it is in solid contact with it, e.g. through a number of intermediate layers or components like a number of flat layers.

In one embodiment of the invention, the grating coupler is adapted for off-vertical coupling of light, and the refractive element (e.g., a wedge-shaped element) refracts the off-vertical light into a substantially vertical direction.

The refractive element may be made of a moldable material. The refractive element may be made of a polymer.

The refractive element may comprise a plurality of sub-elements, each sub-element being adapted for refracting part of the light emerging from the grating couple in the second coupling direction into the first coupling direction.

The refractive element may comprise a focusing refractive surface.

The device furthermore may comprise an optical element coupled thereto. The optical element may be a vertical cavity surface emitting laser.

It is an advantage of embodiments according to the present invention that use of a separate coupling prism can be avoided.

In one embodiment of the invention, the grating coupler is adapted for off-vertical coupling of light, and the refractive element (e.g., a wedge-shaped element) refracts the off-vertical light into a substantially vertical direction.

In one embodiment of the invention, the refractive element is a wedge-shaped element or an element that has at least partially a wedge shape, e.g. a polymer wedge-shaped element, and is in between an off-vertical grating coupler and the optical element. This wedge-shaped element is provided to refract the first Bragg diffraction order to a vertical wave that operatively couples to a vertically positioned optical element, and vice versa. Second order Bragg reflections can be avoided due to the off-vertical Bragg diffraction. In one advantageous embodiment of the present invention polymer wedges can be used. These wedges can be fabricated, for example, through imprint lithography using a mold, e.g. a mold fabricated using Focused-Ion-Beam (FIB) etching.

Certain embodiments of the present invention provide a device and a method for substantially vertical coupling of light between a waveguide on an integrated photonic circuit, e.g. an SOI-based circuit, and an optical element, such as for example an optical fiber, a light source or a light detector, wherein undesired reflections, such as e.g. second order Bragg reflections back into the waveguide or back into the optical element, are substantially reduced as compared to prior art solutions.

Another aspect of the invention is a method for coupling light between an integrated photonic waveguide and an optical element in a first coupling direction, the method comprising: coupling light from the integrated photonic waveguide through a grating coupler in a second coupling direction; and refracting light emerging from the grating coupler in the second coupling direction into the first coupling direction. The refracting thereby is performed using a refractive element integrated in an integrated photonics device comprising also the integrated photonic waveguide. The first coupling direction can be, for example, perpendicular to the average plane of the integrated photonic waveguide. The refraction can be performed using a refractive element disposed adjacent the integrated photonic waveguide. The refractive element can be, for example, a wedge-shaped element integrated with the grating coupler.

In a further aspect, the present invention furthermore relates to a method for coupling light between an integrated photonic waveguide and an optical element in a first coupling direction using an integrated photonics device comprising the integrated photonic waveguide, the method comprising refracting light emerging from an optical element in a first coupling direction into a second coupling direction using an integrated refractive element integrated in the integrated photonics device and coupling light refracted in the second coupling direction via a grating coupler in the integrated photonics waveguide.

In one aspect, the present invention also relates to a method for fabricating an integrated photonic device coupleable to an optical element in a first coupling direction, the method comprising obtaining a photonic device comprising an integrated photonics waveguide and a grating coupler, integrally forming on the grating coupler a refractive element adapted for refracting light emerging from the grating coupler into a different direction.

It is an advantage of certain embodiments of the present invention that the methods and devices allow substantially vertical coupling between a waveguide and an optical element with low second order Bragg reflections. It is a further advantage of certain embodiments of the present invention that the method can allow wafer scale fabrication. They can enable low cost flip-chip bonding of optical components such as for example III-V laser sources, e.g. vertical cavity lasers, to photonic integrated circuits. They can further allow substantially vertical coupling of optical fibers to photonic integrated circuits, which can simplify packaging and wafer-scale diagnostics.

The invention, as well as the features and advantages thereof, may be better understood by reference to the following detailed description when read with the accompanying drawings.

DETAILED DESCRIPTION OF THE INVENTION

In the following detailed description, numerous specific details are set forth in order to provide a thorough understanding of the invention and how it may be practiced in particular embodiments. However it will be understood that the present invention may be practiced without these specific details. In other instances, well-known methods, procedures and techniques have not been described in detail, so as not to obscure the present invention. While the present invention will be described with respect to particular embodiments and with reference to certain drawings, the reference is not limited hereto. The drawings included and described herein are schematic and are not limiting the scope of the invention. It is also noted that in the drawings, the size of some elements may be exaggerated and, therefore, not drawn to scale for illustrative purposes.

Furthermore, the terms first, second and the like in the description and in the claims, are used for distinguishing between similar elements and not necessarily for describing a sequence, either temporally, spatially, in ranking or in any other manner. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

It is to be noticed that the term "comprising", used in the claims, should not be interpreted as being restricted to the steps or elements listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B.

In the context of this invention, the terms "radiation" and "light" are used for indicating electromagnetic radiation with a wavelength in a suitable range, i.e. electromagnetic radiation with a wavelength that is not absorbed by the materials used (e.g. the waveguide material), for example electromagnetic radiation with a wavelength between 1 µm and 2 µm, e.g. near infrared radiation (NIR) or short wavelength infrared radiation (SWIR).

"Vertical" or "normal" coupling is used to indicate that light is coupled out of a waveguide or out of an integrated photonic device comprising a waveguide in a direction that is substantially perpendicular to the average plane determined by a substrate comprising the waveguide (e.g. a substrate comprising a photonic integrated circuit), and vice versa for in-coupling of light. "Substantially vertical" coupling is used to indicate that a substantial part of the light, i.e. at least 80%, more preferred at least 90%, still more preferred at least 95% of the light is coupled vertically.

Where the term high refractive contrast is used, reference may be made to systems wherein the difference in refractive index, e.g. between cladding material and core material, is larger than one refractive index unit. Where reference is made to low refractive index materials, reference may be made to glass-based waveguides. Reference also may be made to material systems based on III-V semiconductor materials such as for example InP or GaAs. In such material systems the refractive index contrast may be limited to less than 1, e.g. to one or a few tenths of a refractive index unit.

Certain embodiments of the present invention are described in more detail below for the particular case of substantially vertical coupling. However, the methods and devices of the present invention can be used in applications where non-vertical coupling to an optical element is needed. Moreover, certain embodiments of the present invention are described in more detail below for the particular case of a 1D second order grating coupler. However, the methods and devices of the present invention can be used with other types of couplers.

In the context of the present invention, the term "refractive element" is an element that is operable to refract light from one direction to another. For example, the refractive element can be disposed adjacent to the grating coupler and shaped such that its upper surface is not substantially parallel to the waveguide substrate.

In the context of the present invention, the term "wedge" or "wedge-shaped element" is used for indicating a 3D structure comprising at least partially a triangular cross section in a plane perpendicular to the average plane determined by the substrate on which it is located. A wedge or wedge-shaped element also may comprise a plurality of sub-elements having a wedge-shape. The shape of a wedge in a plane parallel to the average plane determined by the substrate can be any shape, such as for example a rectangle or a circle.

Certain embodiments of methods and the devices of the present invention are described in more detail below for a silicon on insulator (SOI) material system. However, the methods and the devices can be used with other material systems such as for example III-V material systems or low index contrast material systems.

Certain aspects of the present invention relate to methods and devices for coupling, e.g. substantially vertical coupling, of light between a waveguide, e.g. a waveguide on an integrated photonic circuit, and an optical element, such as for example an optical fiber, a light source or a light detector. According to embodiments of the present invention, an integrated photonic device is disclosed being operatively coupleable with an optical element in a first coupling direction. The integrated photonic device thereby comprises an integrated photonic waveguide and a grating coupler that is adapted for diffracting light from the waveguide into a second coupling direction different from the first coupling direction. It furthermore comprises a refractive element disposed adjacent the grating coupler and adapted to refract the light emerging from the grating coupler in the second coupling direction into the first coupling direction. In view of the reversibility of the light path, the components thus also are adapted for accommodating the inverse light path. Integration thereby may be such that the refractive element is integrally formed on the grating coupler. Integrally formed may comprise that the refractive element is integrated during manufacturing, e.g. the refractive element may be wafer-scale integrated or die-scale integrated. The refractive element may be in direct contact with the grating coupler. Such integrated photonics devices may result in an increase of coupling efficiency. Such embodiments advantageously may be used in applications for coupling light from lasers, such as Vertical Cavity Surface Emitting Lasers, into a waveguide. Another application is an efficient and easy mechanical coupling between fibres and waveguides. An advantage of such coupling is that it allows for example fibres and waveguides to be positioned perpendicular with respect to each other, while still having efficient coupling. One embodiment of a method according to the present invention comprises providing a wedge-shaped element, e.g. a polymer wedge, in between an off-vertical grating coupler and the optical element, the wedge-shaped element being integrated with the grating coupler. This refractive element, e.g. wedge-shaped element, may be for example provided to refract the first Bragg diffraction order to a vertical wave that couples to a vertically positioned optical element, and vice versa. Second order Bragg reflections can be avoided due to the off-vertical Bragg diffraction.

The invention is described in further detail below for wedges made of a polymer material. However, any material that is substantially transparent in the wavelength range of interest and that has a refractive index different from the material of the grating (e.g., silicon) and that of the external propagating medium (e.g., air) can be used for forming a refractive element. By way of example, instead of a polymer or polymer-based material, the refractive element also may be made of an oxide or nitride material. Oxides or nitrides may for example be fabricated by gray scale lithography or 3D lithography. As described further in more detail below, one other preferred fabrication method involves imprinting/molding and necessitates a moldable material. A moldable material can be, for example, a curable material (e.g., a material that is initially in a liquid form and that can be hardened by UV radiation or by heat). A moldable material can also be a thermoplastic (e.g., a hard material that can be softened for molding by heat and/or pressure). Polymer wedges can for example be fabricated by imprint lithography using a mold, e.g., a mold fabricated using Focused-Ion-Beam (FIB) etching.

Figure 1:
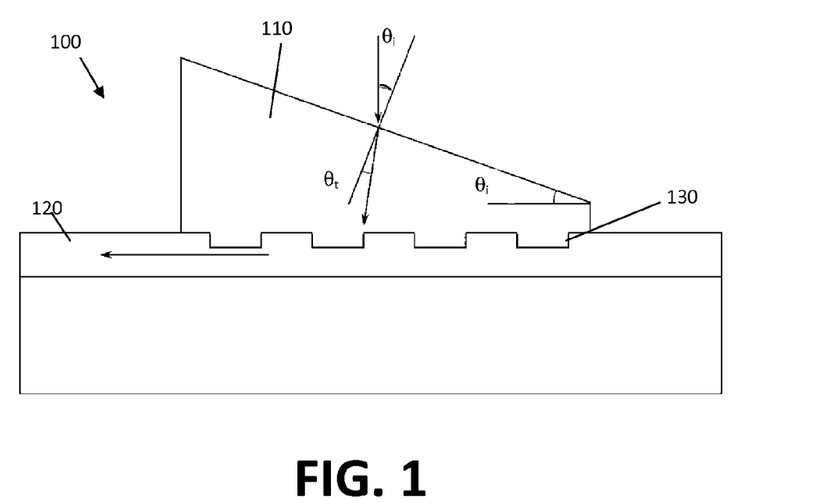
FIG. 1 illustrates principle cross-section of an integrated photonic device with grating with a wedge-shaped element according to one embodiment of the present invention.
Figure 2:
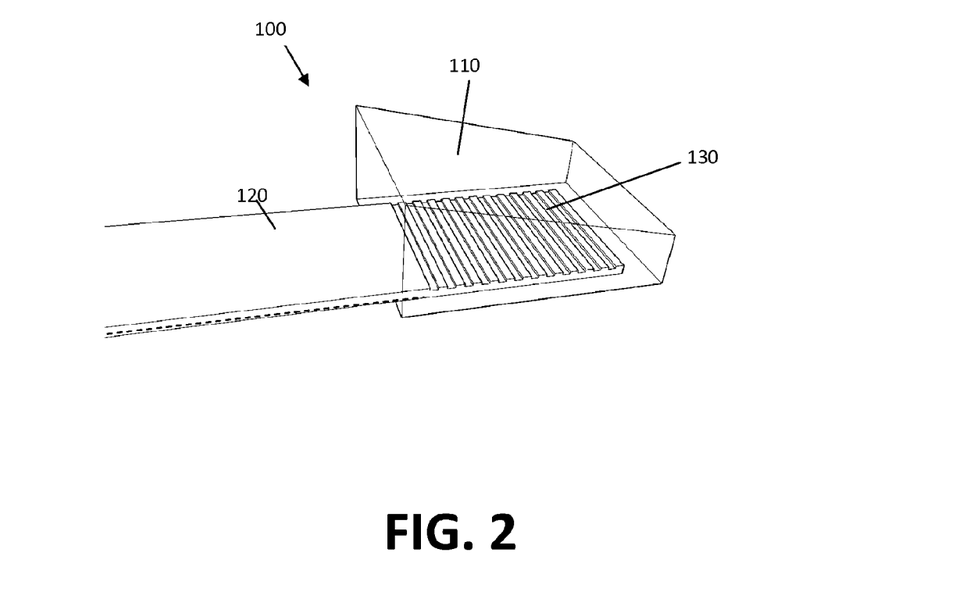
FIG. 2 illustrates a 3D view of the integrated photonic device as shown in FIG. 1

FIG. 1 illustrates the principle of a device 100 comprising a refractive element 110, in the present example being a polymer wedge, according to one embodiment of the present invention. FIG. 1 shows a cross-section of a waveguide, comprising a core layer 120 and cladding layers surrounding the core layers, in the present example being the substrate 140 and the surrounding air. The waveguide of the example shown in FIG. 1 is a SOI (Silicon On Insulator) waveguide. Furthermore, a grating coupler 130, in the present example formed in the silicon core layer is shown and a refractive element, in the present example being a polymer wedge 110 is integrally formed on top of the grating coupler 130. FIG. 2 illustrates a 3D view thereof. In the example shown, the shape of the wedge in a plane parallel to the average plane of the substrate on which it is located is a rectangle. However, other shapes are possible in this embodiment of the invention, provided that there is a refracting element, e.g. a wedge-shaped element, located over the grating. The shape of the refracting element may be circular or elliptical for better matching with different types of grating couplers or to reduce the volume of the wedge. The dimensions of the wedge in a plane parallel to the integrated photonic circuit are preferably at least as large as the grating coupler, because otherwise part of the light would not be refracted. The height of the wedge, i.e. its size in a direction substantially perpendicular to the average plane of the substrate, is preferably less than 20 μm more preferred less than 15 μm still more preferred less than 10 μm. In one embodiment of the invention, the refractive element has a wedge angle ($\theta_i$) in the range larger than 0 degrees to about 45 degrees, e.g. a range of (about) 5 degrees to (about) 45 degrees (e.g., from (about) 10 degrees to (about) 35 degrees). The person of skill in the art can use the coupling angle of the grating, the desired coupling angle of an optical element, the refractive indices of the refractive element material and the environment and Snell's law to determine the appropriate wedge angle of the refractive element.

As illustrated in Fig. 1, light that is incident, in the illustration of FIG. 1 e.g. substantially vertically incident, on the structure is refracted by the refractive element, e.g. polymer wedge, such that a different direction of incidence, e.g. an off-vertical incidence, is obtained at the grating coupler, i.e. at the interface between the grating coupler and the polymer wedge. By way of illustration, the situation is sketched for originally substantially vertically incident light. The light is refracted to an angle ($\theta_r$) with respect to the normal on the refractive surface of the refractive element, resulting in this off-vertical incidence on the grating coupler 130. This off-vertical incidence is optimal for optical coupling with low reflections into the silicon waveguide. In the reverse process, when light is to be coupled out of the silicon waveguide, the polymer wedge refracts the first Bragg diffraction order to a substantially vertical wave that may be coupled to a substantially vertically positioned optical element such as for example an optical fiber, a light source or a light detector.

Figure 8:
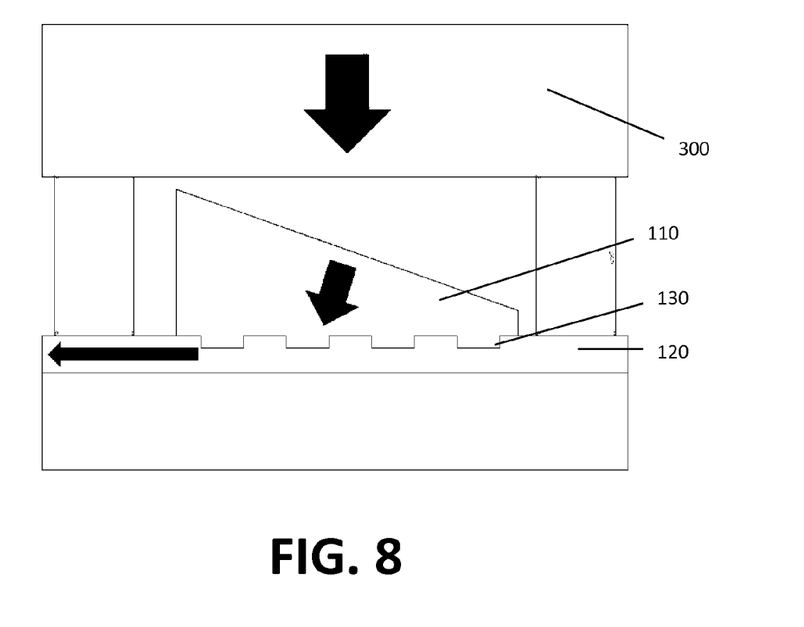
FIG. 8 shows a device after flip-chip bonding of a VCSEL on top of a grating coupler with polymer refractive wedge.

One embodiment of a method for fabricating a device according to the present invention comprises providing on a conventional grating coupler a refractive element (e.g., a wedge-shaped element). Such an element may for example be fabricated through an imprinting technique using a mold having the inverse or negative shape of the elements to be formed (i.e. a mold comprising a negative wedge shape). Such an imprinting technique may for example be an embossing technique. In one example, in a first step a curable material is provided (e.g. by dispensing, spin coating or any other suitable method known by a person skilled in the art) on the substrate comprising the grating coupler (e.g. integrated photonic circuit) or on the mold. Then the mold is brought into contact with the substrate comprising the grating coupler, such that the curable material substantially fills the negative wedges of the mold, and thereby aligning the negative wedge of the mold to the grating coupler. In a next step the curable material is cured to form the refractive element as a solid polymer. Curing the polymer material can include, for example, UV curing (i.e. illumination with UV light), thermal curing or a combination of both UV curing and thermal curing. After curing, the mold is removed and an optical element 300, such as an optical fiber, a light source or a light detector may be mounted over the wedge on the grating coupler (as e.g. illustrated in FIG. 8), for example by use of a flip chip technology or using any other suitable technology known by a person skilled in the art. The person of skill in the art will recognize that other methods, such as hot-embossing of wedge shapes in a thermoplastic polymer layer, can be used to form the refractive element on the grating coupler.

By way of illustration, the present invention not being limited hereby, a numerical example of an integrated photonic device with integrated refractive element is provided, adapted for having an efficient coupling. The example is provided for a substantially vertically incident light ray. The operation of a device according to the present invention was numerically simulated. For the simulations, a refractive polymer element with a refractive index of 1.506 was assumed on top of a grating coupler with 20 rectangular slits of 315 nm wide and 70 nm deep, spaced by 315 nm. This coupler was formed in a 220 nm thick silicon layer on top of a 2 µm thick oxide buffer layer. Simulations were performed in 2D, which is a good approximation for the 10 µm wide waveguides used in the experiments. Numeric calculations were performed by the Finite Difference Time Domain (FDTD) method.

In a first step the angle was calculated under which light with a 1.55 µm wavelength couples out of the silicon waveguide if the grating is covered with a polymer having a refractive index of 1.506 (e.g. PAK polymer). It was found that for the considered configuration, this angle is 8.6° relative to the normal to the average substrate plane. In a second step the angle $\theta_i$ (see FIG. 1) was calculated by solving the equation $\theta_i - \theta_r = 8.6°$ and taking into account Snell's law. It was found that for the given example this angle $\theta_i$ equals 24.7°. This design was verified with FDTD in Omnisim, using a grid size of 15 nm. The power fraction that is coupled between an optical fiber and a silicon waveguide was calculated for excitation from the fiber. For a standard grating coupler with an optical fiber positioned at 10° off-normal the calculated coupling efficiency is 43%. With a setup comprising the structure as shown in FIG. 1 with a wedge angle $\theta_i$ of 24.7° and a vertically positioned optical fiber the calculated coupling efficiency is 49%. This means that theoretically a small increase in coupling efficiency can be expected for a coupling structure according to the present invention. This was verified with a calculation of Fresnel's equations. It was found that the insertion of a polymer wedge according to the present invention in principle reduces the power reflection of a vertically incident plane wave from 30% to 20%. This increase is somewhat compensated by a decrease of the grating efficiency due to a different angle and index contrast.

Figure 3:
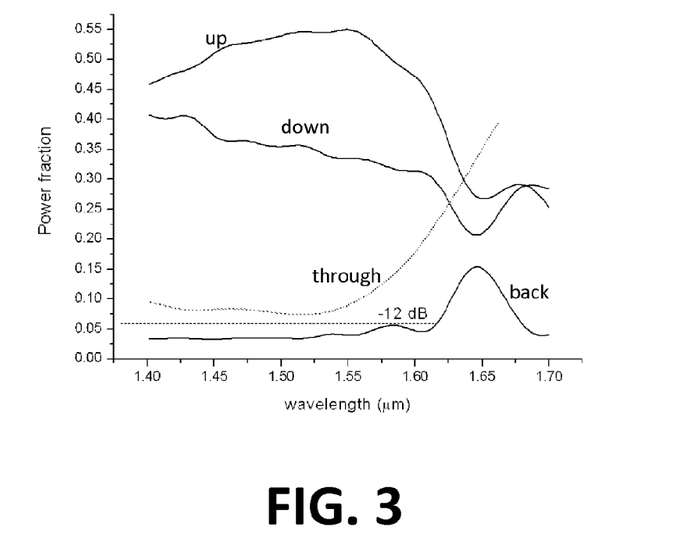
FIG. 3 shows power fractions coupled by a grating coupler with a wedge-shaped element, for excitation from a silicon waveguide.

FIG. 3 shows the power fraction coupled by the simulated grating coupler with the polymer wedge, for excitation from the silicon waveguide. The power fractions coupled up (i.e. in a direction perpendicular to the waveguide plane and from the waveguide into the air), down (i.e. in a direction perpendicular to the waveguide plane and from the waveguide into the oxide underlying the silicon), back (i.e. back into the waveguide in a direction opposite to the excitation direction) and through (i.e. in the waveguide in the excitation direction), are shown. It was found that reflections back into the waveguide are below −12 dB for wavelengths up to 1616 nm. However, the expected experimental reflections may be lower, because scattered light in the wedge creates a noise background during the simulation. By artificially shielding the detector with a thin gold stripe a reflection lower than −20 dB was obtained. The range of wavelengths, for which back reflection is that low, can be extended by designing the grating couplers for operation at off-vertical angles, e.g. at angles greater than 10°. Accordingly, in one embodiment of the invention, the first coupling direction is substantially vertical, and the second coupling direction is greater than 10 degrees from normal (e.g., in the range of 10-40 degrees, or in the range of 10-30 degrees). In other embodiments, the second coupling direction may be smaller than 10 degrees from normal, but larger than 0°. The grating couplers also may be designed for operation at smaller off-vertical angles.

Figure 4A:
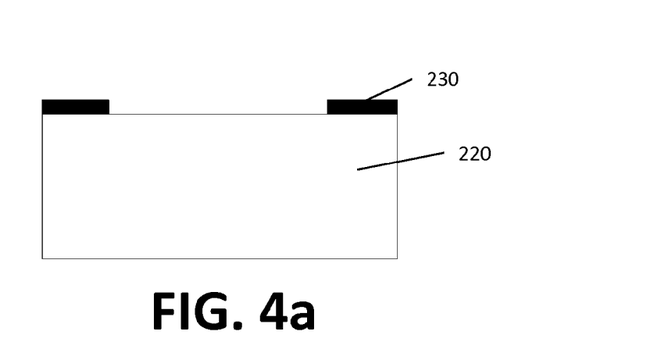
FIGS. 4a and 4b is a schematic overview of a fabrication procedure for a mold as can be used for fabrication of an integrated photonic device according to one embodiment of the present invention.
Figure 4B:
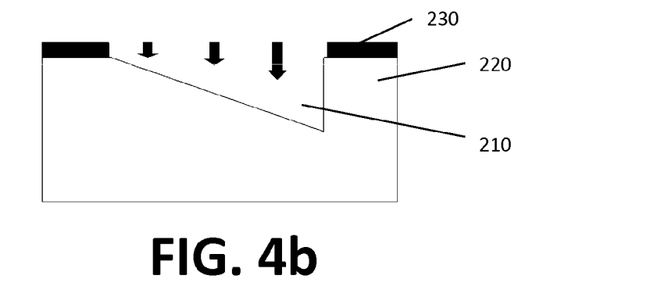

By way of illustration, an example of a method for fabricating an integrated device and the optional steps of fabricating the mold are described below. The polymer wedges according to one embodiment of the present invention can for example be fabricated by imprint lithography using a mold. Such a mold 200 comprises recessed areas 210 of typically 15×15×8 microns in size containing facets that make a certain angle with respect to the surface of the mold to form negative wedges. The mold may for example be fabricated using FIB (Focused-Ion-Beam) etching. When using for example a UV curable material like a UV curable polymer for forming the wedge-shaped elements, the mold 200 for imprinting these elements is preferably transparent to UV light. For example a transparent substrate 220, e.g. a glass substrate like a quartz substrate can be used for fabricating such a mold. However, to avoid charging problems during FIB etching of the mold, the transparent substrate 220 is preferably covered with an electrically conductive layer 230, such as for example a metal layer. An experiment was performed wherein the glass substrate for fabricating a mold was first covered with a 100 nm thick layer of Ti that was electrically connected to the sample stage in the FIB vacuum chamber. Using optical lithography and Ti lift-off the locations were defined where wedges are to be formed and where alignment structures are to be printed for the imprint lithography (see FIG. 4a). The glass substrate was etched for forming wedge-shaped structures (see FIG. 4b). Etching of the glass substrate was done by scanning a focused beam of gallium ions at normal incidence (7 nA, 30 keV). Image recognition was used to align the ion beam lithography to the locations that were defined on the glass substrate by the Ti lift-off step. In this way 60 wedges were etched in a single glass substrate in an automated way. The wedges had a rectangular cross section in a plane parallel to the plane determined by the photonic integrated circuit with a size of 14 µm by 16 µm, and had a height of 8 µm. The time needed amounted to about 15 minutes per wedge shape. A precisely angled wedge shape (an angle of 24.7 degrees was made with a precision of better than ±1 degree) and a smooth (roughness lower than 5 nm) bottom of the mold were obtained by varying the dose in the etched rectangle. The Ion Beam Lithography mask consisted of an array of 160 lines, 100 nm apart and 14 μm long. These were scanned digitally, with a step size of 200 nm and a varying dwell time (from 1.2 mC/cm2 to 30.965 mC/cm$^2$ with a step of 0.1872 mC/cm2). This procedure was repeated 60 times; so the dose of the deepest line was 1.86 C/cm2. This process was conducted with a Raith scan generator connected to an FEI Nova Nanolab 600. Optimization of this procedure was performed by cross-sectional inspection and iteration. It was found that the angled etch pit bottom (corresponding to the optically smooth refraction plane) is no longer planar when the largest available beam current of 20 nA is used, which may be caused by a lower beam quality. Experiments with larger wedge angles showed that for wedge angles larger than about 45° ripples were formed, such that smooth refraction planes were not obtained.

Although FIB fabrication of a mold inherently avoids problems of optical losses, these can still be detrimental when a transparent mold is used. For example, if the transparency of the mold (e.g. for UV transmission) would be reduced, e.g. substantially reduced, by the etch procedure, exposure of the polymer through the etched mold would become difficult. However, no effects of this kind have been observed.

Refractive elements such as for example polymer wedges can be fabricated using the mold, for example using an imprint technique. In the present example, after etching of recessed areas 210 the quartz mold 200 was prepared for imprinting by performing an anti-adhesive treatment. For a first group of wedges the patterned Ti layer 230 and the negative wedges 210 were first covered with a 100 nm thick layer of silica by plasma deposition. Then the mold was immersed in (tridecafluoro-1,1,2,2-tetrahydrooctyl)tricholorosilane ($C_8H_4Cl_3F_{13}Si$) in a pentane solution (0.1%) and subsequently rinsed using acetone, isopropyl alcohol and deionized water. The thin deposited silica layer was used because this anti-adhesive treatment is designed for silicon oxide. An advantage of the patterned Ti layer is that, as the UV exposure does not penetrate the Ti layer, regions in between the wedges are not exposed, such that no residual polymer layer is present in between the wedges after curing. However, it was found that in this case (i.e. without a residual polymer layer in between the wedges), the wedges are easily released from the silicon (silicon-on-insulator substrate) during mold removal or subsequent rinsing. For a second group of wedges the yield was greatly increased by completely removing the Ti layer from the mold (in diluted HF) and doing the anti-adhesive treatment of the mold directly on the quartz. This leaves a residual layer (see FIG. 5b) in between the wedges after curing. The thickness of this residual polymer layer depends on the applied pressure during imprinting and on the viscosity of the polymer. In the context of the present invention, only wedges with residual layer were characterized.

Figure 5A:
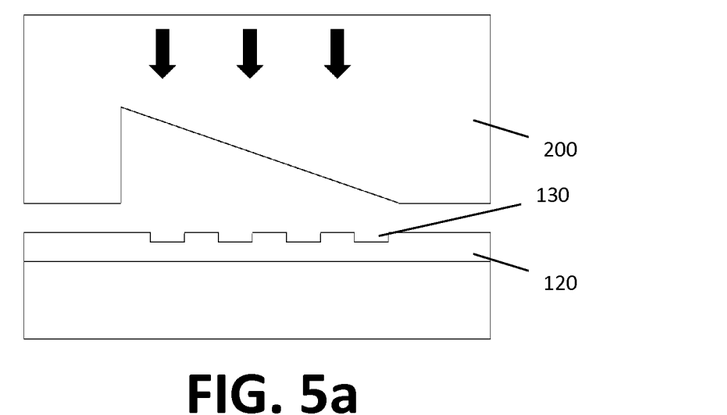
FIG. 5a and FIG. 5b illustrates a fabrication procedure for imprinting a refractive element on a grating coupler for forming an integrated photonic device according to an embodiment of the present invention.

The example of a method for fabricating an integrated photonics device therefore comprises obtaining a photonics device comprising an integrated photonics waveguide and a grating coupler introduced thereon. Such photonics devices can be made using conventional manufacturing techniques, such as for example conventional wafer-scale manufacturing techniques. The method furthermore comprises forming a refractive element, e.g. a wedge-shaped element on the grating coupler. Experiments were performed with two different UV curable polymers for forming the wedges: PAK (PAK-01 from Toyo Gosei Co. Ltd.) and SU8 (SU8-10 from Micro-Chem). Both were dispensed on a sample comprising a waveguide with a grating prior to alignment of a mold over the sample (i.e. alignment of the negative wedges in the mold with the grating couplers on the sample) and pressing of the mold on the sample. Then the polymer was exposed to UV light through the mold (performed on Karl Suss MA6), as illustrated in FIG. 5a. The SU8 resist that was used is more viscous than the PAK material, so a thicker residual layer next to the wedges (as e.g. shown in FIG. 5b) can be expected after removal of the mold. After mask removal the samples were flood exposed under a UV fiber lamp for 5 minutes.

Figure 5B:
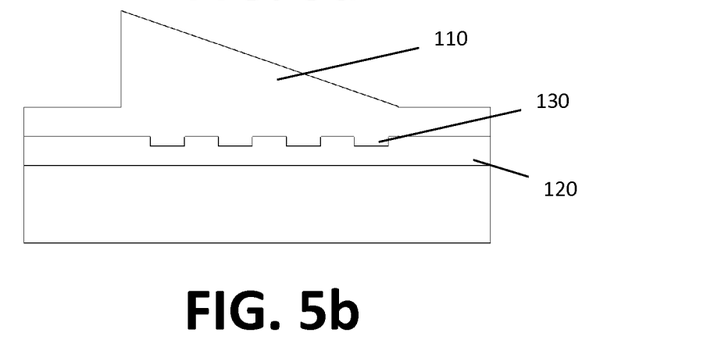

To determine the coupling efficiency of the fabricated coupling structure (as shown in FIG. 5b) a fiber-to-fiber transmission measurement was performed for TE polarized light, generated by a superluminescent LED (SLED) or by a tunable laser source. A single mode fiber connected to a SLED or a tunable laser source was positioned over a first grating coupler; another optical fiber was positioned over a second grating coupler on the same waveguide and connected to an optical spectrum analyzer or to a photodetector. From the obtained transmission spectrum, the fiber-to-waveguide coupling efficiency of a single grating coupler was calculated. The coupling structure comprised two grating couplers fabricated with optical lithography (with the dimensions as mentioned above, i.e. a grating coupler with 20 rectangular slits of 315 nm wide and 70 nm deep, spaced by 315 nm, formed in a 220 nm thick silicon layer on top of a 2 μm thick oxide buffer layer) and polymer wedges according to one embodiment of the present invention, on a substrate comprising an optical integrated circuit. In the integrated circuit the light was guided by a straight 10 μm wide silicon waveguide and tapered down to a wire with a width of approximately 500 nm. First a reference measurement was performed on grating couplers without a polymer wedge, with both fibers positioned off-vertical (at an angle of 10° relative to the normal position). Then, the fibers were tilted to a perfectly normal position and positioned above the grating couplers with polymer wedges.

Figure 6:
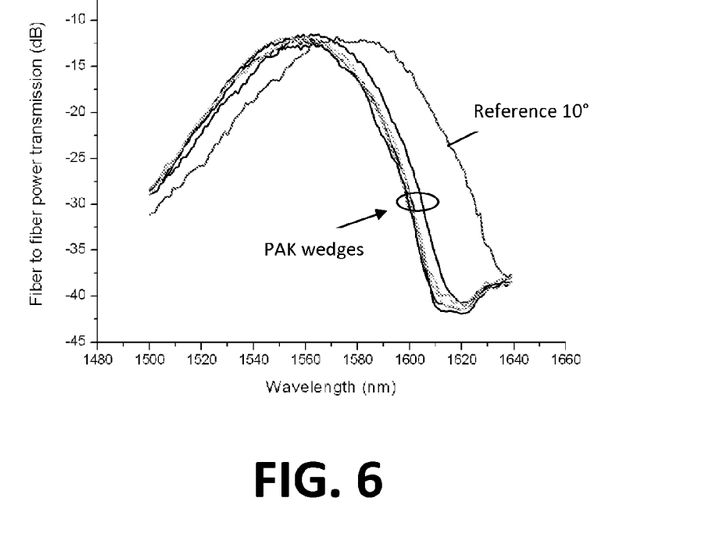
FIG. 6 shows the fiber-to-fiber power transmission for five devices measured on the same sample with imprinted PAK wedges.
Figure 7:
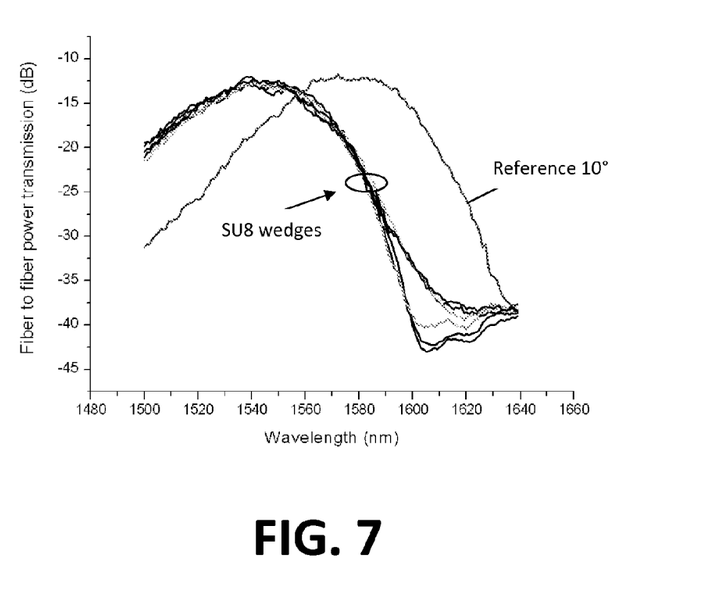
FIG. 7 shows the fiber-to-fiber power transmission for six devices measured on the same sample with imprinted SU-8 wedges.

FIG. 6 and FIG. 7 depict the measurement results for different wedge pairs on two samples, with imprinted PAK wedges and with SU8 wedges respectively. The measured power (in dBm) is shown for a laser output power of 1 mW. From the results it can be concluded that there is no coupling efficiency penalty in the case of PAK wedges. For SU8 wedges there is a small loss in coupling efficiency. This may be related to the thicker residual layer.

Figure 9:
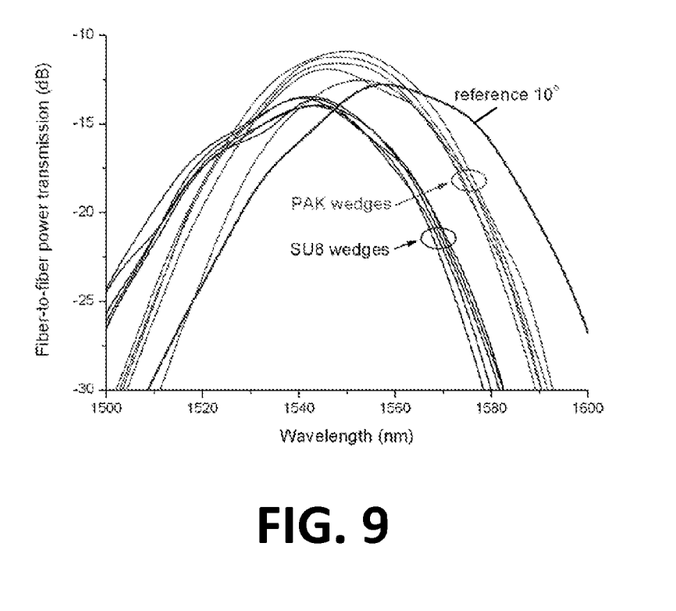
FIG. 9 shows the fiber-to-fiber power transmission for five wedge pairs on two different samples.

FIG. 9 depicts the measured fiber-to-fiber coupling efficiencies for five different wedge pairs on both samples with SU8 and PAK wedges. The measurement results shown in FIG. 9 where obtained with a SLED as a light source and with an optical spectrum analyzer as a light detector. Coupling with 10° off-normal fibers causes a loss of 13 dB, i.e. about 6.5 dB per coupler. With vertically positioned fibers above the PAK wedges a slightly higher coupling efficiency (5 to 6 dB per coupler) is obtained. The SU8 wedges, on the other hand, show a somewhat lower coupling efficiency. This can be attributed to a thicker residual polymer layer in between the wedges due to the higher viscosity of SU8 as compared to PAK and possibly to some misalignment. Nevertheless, from these results it can be concluded that the angled refractive planes of the wedges have a good optical quality. This illustrates the ability of FIB milling of optically smooth structures in quartz.

Figure 10:
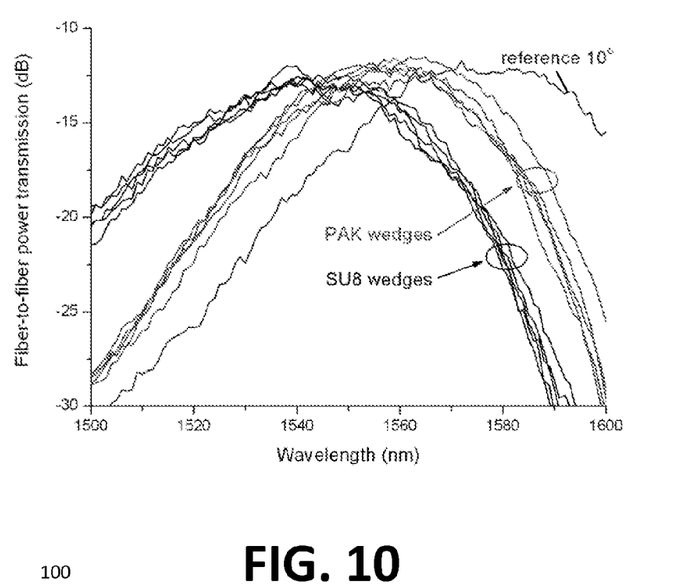
FIG. 10 shows the fiber-to-fiber power transmission of the devices of FIG. 9, after a thermal cycle at 300° C.

The polymer wedges according to embodiments of the present invention enable flip-chip bonding of vertically emitting lasers. However, this process requires a thermal cycle of typically between 240° C. and 300° C. To assess the thermal stability of the two polymers, both samples were baked for 5 minutes at 300° C. on a hotplate in air. Afterwards the fiber-to-fiber transmission was measured again (in this case with a tunable laser as a light source). The results are shown in FIG. 10. The PAK polymer wedges show a decrease of coupling efficiency, although the values do not drop below that of the reference couplers. The SU8 wedges show no decrease in coupling efficiency. Based on this it can be concluded that the SU8 polymer shows a better thermal stability. A higher coupling efficiency with SU8 wedges may be obtained when using SU8 of lower viscosity. This can for example be obtained by mixing it with an appropriate solvent.

Figure 11:
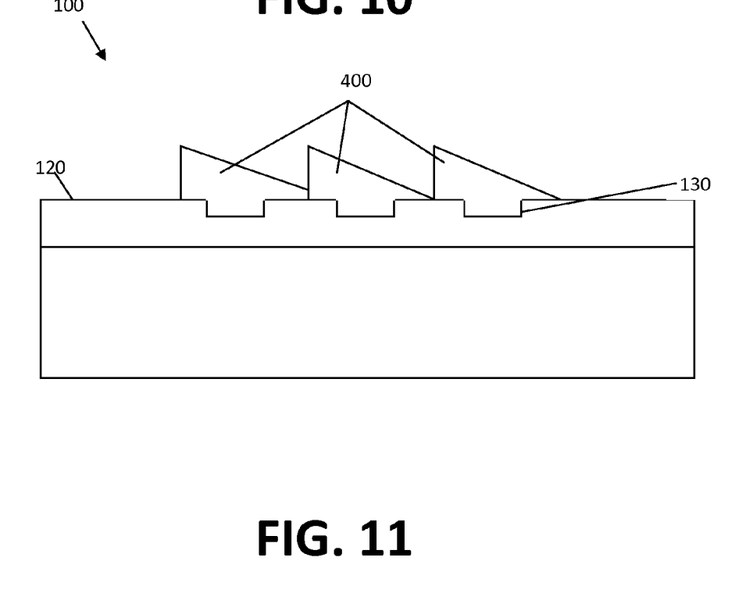
FIG. 11 shows an example of an integrated photonics device according to an embodiment of the present invention whereby the refractive element comprises a plurality of sub-elements.

In one exemplary embodiment, the refractive element may have a plurality of sub-elements 400 having a refraction surface each adapted for refracting part of the light emerging from the grating coupler in the second coupling direction into the first coupling direction, as shown in FIG. 11. The latter allows for reducing the thickness of the refractive element 110 to be used, as it can be build up as a plurality of small refractive sub-elements 400. Such a smaller thickness cannot only result in a reduction of the material to be used or easier upscaling to fit the size of the grating coupler, but also reduces the height of the refractive element 110, extending from the average plane of the integrated photonic device 100.

Figure 12:
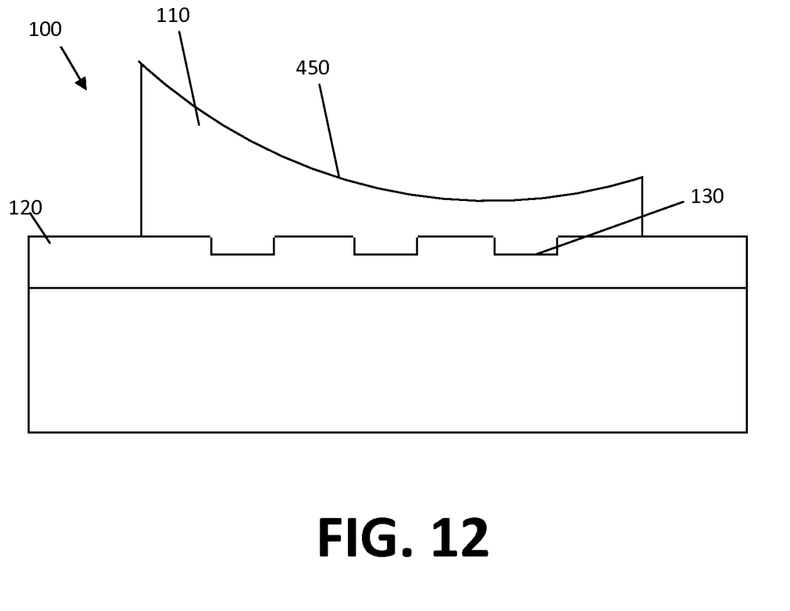
FIG. 12 illustrates an integrated photonics device with a refractive element having a focusing refractive surface, according to an embodiment of the present invention.

In a further exemplary embodiment, as shown by way of illustration in FIG. 12, the refractive element 110 furthermore has a modified refraction surface 450. The refraction surface 450 is not a planar surface allowing to refract all light emerging in the second coupling direction into a fixed first coupling direction, but the refraction surface 450 is a curved surface having a lensing function. In this way the surface may redirect incident light rays and have an additional focusing effect. Such a refraction surface may be adapted to adjust the size of the light beam when a size difference exist between e.g. the optical element and the grating coupler. The curved refraction surface can be made using the techniques as described above, such as imprinting, embossing, etc. Alternatively or in addition thereto, such a refraction surface 450 also may be established by post-processing a previously made refraction surface using techniques such as laser-ablation.

As illustrated above and as set out in the accompanying claims, the present invention also encompasses a method for guiding light between an integrated photonics waveguide and an optical element. Such a method may comprise one, more or all functionalities of the components described in the aspect above. The present invention furthermore relates to a method for manufacturing an integrated photonics device as described in the aspect above.

The invention claimed is:

1. An integrated photonic device operatively coupled with an optical element configured to guide light in a first coupling direction perpendicular to the integrated photonic device, the integrated photonic device comprising:
   an integrated photonic waveguide comprising a core layer having top surface and a bottom surface, the integrated photonic waveguide being disposed on a substrate with its bottom surface facing the substrate;
   a grating coupler formed in the top surface of the core layer of the integrated photonic waveguide, the grating coupler being adapted for diffracting light from the core layer of the waveguide into a second coupling direction different from the first coupling direction; and
   a refractive element disposed adjacent the top surface of the core layer of the integrated photonic waveguide such that the grating is between the core layer of the waveguide and the refractive element, the refractive element being integrated with the grating coupler and adapted to refract the light emerging from the grating coupler in the second coupling direction into the first coupling direction, the refractive element having a refractive index different from the material of the grating,
   wherein the first coupling direction is perpendicular to an average plane of the substrate on which the waveguide is disposed.

2. A device according to claim 1, wherein the refractive element is a wedge-shaped element integrated with the grating coupler.

3. A device according to claim 1, wherein the grating coupler comprises a grating, and the refractive element is made in direct contact with the grating of the grating coupler.

4. A device according to claim 1, wherein the refractive element is integrally made in the integrated photonics device by directly forming the refractive element in the integrated photonics device.

5. A device according to claim 1, wherein the refractive element is made of a moldable material.

6. A device according to claim 5, wherein the refractive element is made of polymer.

7. A device according to claim 1, wherein the refractive element comprises a plurality of sub-elements, each sub-element being adapted for refracting part of the light emerging from the grating coupler in the second coupling direction into the first coupling direction.

8. A device according to claim 1, wherein the refractive element comprises a focusing refractive surface.

9. A device according to claim 1, wherein the optical element is a vertical cavity surface emitting laser.

10. A method for coupling light between an an integrated photonic device and an optical element configured to guide light in a first coupling direction, the integrated photonic device comprising:
   an integrated photonic waveguide comprising a core layer having top surface and a bottom surface, the integrated photonic waveguide being disposed on a substrate with its bottom surface facing the substrate;
   a grating coupler formed in the top surface of the core layer of the integrated photonic waveguide, the grating coupler being adapted for diffracting light from the waveguide into a second coupling direction different from the first coupling direction; and
   a refractive element disposed adjacent the top surface of the core layer of the integrated photonic waveguide such that the grating is between the core layer of the waveguide and the refractive element, the refractive element being integrated with the grating coupler and adapted to refract the light emerging from the grating coupler in the second coupling direction into the first coupling direction, the refractive element having a refractive index different from the material of the grating,
the method comprising:
   coupling light from the core layer of the integrated photonic waveguide through the grating coupler in the second coupling direction; and
   refracting light emerging from the grating coupler in the second coupling direction into the first coupling direction using the refractive element integrated with the grating coupler,
   wherein the first coupling direction is perpendicular to an average plane of the substrate on which the waveguide is disposed.

11. A method for coupling light between an integrated photonic device and an optical element configured to guide light in a first coupling direction, the integrated photonic device comprising:
- an integrated photonic waveguide comprising a core layer having top surface and a bottom surface, the integrated photonic waveguide being disposed on a substrate with its bottom surface facing the substrate;
- a grating coupler formed in the top surface of the core layer of the integrated photonic waveguide, the grating coupler being adapted for diffracting light from the waveguide into a second coupling direction different from the first coupling direction; and
- a refractive element disposed adjacent the top surface of the core layer of the integrated photonic waveguide such that the grating is between the core layer of the waveguide and the refractive element, the refractive element being integrated with the grating coupler and adapted to refract the light emerging from the grating coupler in the second coupling direction into the first coupling direction, the refractive element having a refractive index different from the material of the grating, the method comprising:
- refracting light emerging from the optical element in the first coupling direction into a second coupling direction using the refractive element integrated with the grating coupler; and
- coupling light refracted in the second coupling direction via the grating coupler,
- wherein the first coupling direction is perpendicular to an average plane of the substrate on which the waveguide is disposed.

12. A device according to claim 1, wherein the optical element is an optical fiber.

13. A device according to claim 1, wherein the second coupling direction is in the range of 10° to 40° from normal to the average plane of the integrated photonic waveguide.

14. An integrated photonic device operatively coupleable with an optical element in a first coupling direction, the integrated photonic device comprising:
- an integrated photonic waveguide comprising a core layer having top surface and a bottom surface, the integrated photonic waveguide being disposed on a substrate with its bottom surface facing the substrate;
- a grating coupler formed in the top surface of the core layer of the integrated photonic waveguide, the grating coupler being adapted for diffracting light from the core layer of the waveguide into a second coupling direction different from the first coupling direction; and
- a wedge-shaped refractive element adjacent the top surface of the core layer of the integrated photonic waveguide such that the grating is between the core layer of the waveguide and the refractive element, the refractive element being integrated with the grating coupler by being directly formed in the integrated photonic device and adapted to refract the light emerging from the grating coupler in the second coupling direction into the first coupling direction, the refractive element having a refractive index different from the material of the grating.

15. A device according to claim 14, wherein the first coupling direction is perpendicular to an average plane of the waveguide.

16. A device according to claim 15, wherein the second coupling direction is in the range of 10° to 40° from normal to the average plane of the integrated photonic waveguide.

17. A device according to claim 14, wherein the refractive element comprises a plurality of sub-elements, each sub-element being adapted for refracting part of the light emerging from the grating coupler in the second coupling direction into the first coupling direction.

18. An integrated photonic device operatively coupleable with an optical element in a first coupling direction, the integrated photonic device comprising:
- an integrated photonic waveguide comprising a core layer having top surface and a bottom surface, the integrated photonic waveguide being disposed on a substrate with its bottom surface facing the substrate;
- a grating coupler formed in the top surface of the core layer of the integrated photonic waveguide, the grating coupler being adapted for diffracting light from the waveguide into a second coupling direction different from the first coupling direction, the grating coupler comprising a grating; and
- a refractive element disposed in direct contact with the grating coupler by being directly formed in the integrated photonic device such that the grating is between the core layer of the waveguide and the refractive element, the refractive element being adapted to refract the light emerging from the grating coupler in the second coupling direction into the first coupling direction, the refractive element having a refractive index different from the material of the grating.

19. An integrated photonic device according to claim 18, wherein the refractive element is a wedge-shaped element integrated with the grating coupler.

20. A method for fabricating an integrated photonic device according to claim 18, the method comprising:
- providing a photonic device comprising
  - an integrated photonic waveguide comprising a core layer having top surface and a bottom surface, the integrated photonic waveguide being disposed on a substrate with its bottom surface facing the substrate, and
  - a grating coupler formed in the top surface of the core layer of the integrated photonic waveguide, the grating coupler being adapted for diffracting light from the core layer of the waveguide into a second coupling direction different from the first coupling direction, the grating coupler comprising a grating; and then
- directly forming in direct contact with the grating a refractive element such that the grating is between the core layer of the waveguide and the refractive element, the refractive element being adapted for refracting light emerging from the grating coupler in the second coupling direction into the first coupling direction, the refractive element having a refractive index different from the material of the grating.

21. A method according to claim 20, wherein directly forming the refractive element in direct contact with the grating includes molding the refractive element directly on the photonic device.

22. A method according to claim 21, wherein the refractive element is made of polymer.

23. A method according to claim 22, wherein directly forming the refractive element in direct contact with the grating includes
- providing a mold having a wedge-shaped indentation;
- disposing a curable material on the grating or on the mold;
- bringing the mold into contact with the photonic device, aligning the wedge-shaped indentation of the mold with the grating, such that the curable material substantially fills the wedge-shaped indentation of the mold;

curing the curable material to form a wedge-shaped refractive element; and removing the mold from the wedge-shaped refractive element.

24. The method according to claim 20, wherein the first coupling direction is perpendicular to an average plane of the substrate on which the waveguide is disposed.

25. An integrated photonic device according to claim 3, wherein the grating coupler comprises grooves formed in the integrated photonic waveguide, and wherein the material of the refractive element is a molded material filling the grooves of the grating.

26. An integrated photonic device according to claim 25, wherein the refractive element is made of polymer.

* * * * *